(12) United States Patent
Hoelzel et al.

(10) Patent No.: US 9,428,229 B2
(45) Date of Patent: Aug. 30, 2016

(54) AIR GUIDING DEVICE FOR A MOTOR VEHICLE

(71) Applicant: Dr. Ing. h.c. F. Porsche Aktiengesellschaft, Stuttgart (DE)

(72) Inventors: Steffen Hoelzel, Eberdingen (DE); Florian Scheerer, Rutesheim (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 3 days.

(21) Appl. No.: 14/643,004

(22) Filed: Mar. 10, 2015

(65) Prior Publication Data

US 2015/0274221 A1 Oct. 1, 2015

(30) Foreign Application Priority Data

Mar. 26, 2014 (DE) .......................... 10 2014 104 156

(51) Int. Cl.
 *B62D 35/00* (2006.01)
(52) U.S. Cl.
 CPC .................................. *B62D 35/005* (2013.01)
(58) Field of Classification Search
 CPC .............................. B62D 35/005; B62D 35/00
 See application file for complete search history.

(56) References Cited

U.S. PATENT DOCUMENTS

| | | | |
|---|---|---|---|
| 9,266,571 B2* | 2/2016 | D'Arcy | B62D 35/005 |
| 2005/0017541 A1 | 1/2005 | Jungert | |
| 2012/0056038 A1* | 3/2012 | Grip | B64C 9/16 244/213 |
| 2013/0049399 A1 | 2/2013 | Hoelzel et al. | |
| 2013/0076064 A1* | 3/2013 | Smith | B62D 35/007 296/180.1 |

FOREIGN PATENT DOCUMENTS

| | | |
|---|---|---|
| DE | 36 30 645 | 3/1988 |
| DE | 103 25 653 | 12/2004 |
| DE | 10 2006 060 672 | 6/2008 |
| DE | 10 2011 111 456 | 2/2013 |

* cited by examiner

*Primary Examiner* — Lori L Lyjak
(74) *Attorney, Agent, or Firm* — Gerald E. Hespos; Michael J. Porco; Matthew T. Hespos

(57) ABSTRACT

Air guiding device (12) of a motor vehicle has an air guiding element (13) extending in the region of a forward structure part (11) of the motor vehicle completely or partially over the width thereof. An actuating element (16) can displace the air guiding element (13) between an extended operating position in which the air guiding element (13) has an aerodynamic air guiding effect, and a retracted inoperative position in which the air guiding element (13) has substantially no aerodynamic air guiding effect. The air guiding element (13) is formed at least in certain portions from an elastically deformable sheet-like element (15) whose outer contour can be brought into shape in such a way that the sheet-like element (15) ensures laminar flow guidance.

13 Claims, 2 Drawing Sheets

AIR GUIDING DEVICE FOR A MOTOR VEHICLE

CROSS REFERENCE TO RELATED APPLICATION

This application claims priority under 35 USC 119 to German Patent Appl. No. 10 2014 104 156.9 filed on Mar. 26, 2014, the entire disclosure of which is incorporated herein by reference.

BACKGROUND

1. Field of the Invention

The invention relates to an air guiding device for a motor vehicle.

2. Description of the Related Art

DE 103 25 653 A1 discloses an air guiding device of a motor vehicle that has a spoiler lip extending in the region of a forward structure part of the motor vehicle completely or partially over the width of the forward structure part. A pneumatic actuating element can displace the spoiler lip between an extended operating position and a retracted inoperative position. In the extended operating position, the spoiler lip forms a downwardly directed extension of the forward structure part and acts as an aerodynamic air guiding device. In the retracted inoperative position, the spoiler lip is directed rearwardly and has substantially no aerodynamic air guiding effect.

Air guiding devices for a motor vehicle with a pneumatic actuating element for a spoiler lip also are known from DE 10 2011 111 456 A1 and DE 10 2006 060 672 A1.

DE 36 30 645 A1 discloses another air guiding device for a motor vehicle.

The object of the invention is to provide a novel air guiding device for a motor vehicle.

SUMMARY OF THE INVENTION

The invention relates to air guiding element formed at least in certain portions from an elastically deformable sheet-like element whose outer contour can be brought into shape in such a way that the sheet-like element serves for laminar flow guidance or the outer contour thereof ensures laminar flow guidance.

The air guiding device of the invention achieves laminar contact between the flow and the air guiding element in the extended operating position and hence allows particularly advantageous flow guidance. As a result, the effectiveness of aerodynamically acting geometrical features that are positioned behind the air guiding device, such as diffusers, can be improved.

At least one elastic tension band may act on the sheet-like element to achieve the desired contour in the operating position of the air guiding element. As a result, a particularly reliable and dimensionally secure geometry can be ensured.

The air guiding element may be formed by a spoiler lip and by the elastically deformable sheet-like element. In the operating position, the spoiler lip forms a downwardly directed extension of the forward structure part and is directed rearwardly in the inoperative position. The elastically deformable sheet-like element adjoins behind the spoiler lip and below the forward structure part in such a way that the elastically deformable sheet-like element acts with a front portion on a lower portion of the spoiler lip in the operating position and on rear portion of the spoiler lip in the inoperative position and with a rear portion on the forward structure part.

The elastically deformable sheet-like element ensures that, in the operating position, the flow downstream of the spoiler lip comes into laminar contact with the sheet-like element so that subassemblies, such as diffusers, positioned downstream of the air guiding device can be subjected to improved flow.

The at least one elastic tension band acts on the sheet-like element and can bring the sheet-like element into a shape where the front portion is curved convexly down and out and at the rear portion curved concavely up and in. Each elastic tension band acts on a central portion of the sheet-like element in which the curvature thereof changes. Thus, it is advantageously possible to transfer the elastic sheet-like element into the desired curvature and to hold it in the desired curvature.

The air guiding element may be formed completely by the elastically deformable sheet-like element. More particularly, the elastically deformable sheet-like element may act with a front portion on a front portion of the forward structure part and with a rear portion on a rear portion of the forward structure part. Thus, the desired shapes for laminar flow guidance may be achieved merely the elastically deformable sheet-like element and without a spoiler lip.

The actuating element may have air chambers and acts on a portion of the elastically deformable sheet-like element and on a fastening strip for the actuating element. Optionally, at least one elastic tension band may act on a portion of the sheet-like element that is situated behind the portion on which the actuating element acts. Thus, a particularly advantageous shaping for the elastically deformable sheet-like element in the extended operating position of the air guiding device is possible.

Exemplary embodiments of the invention are explained in more detail with reference to the drawing, without being limited thereto.

DETAILED DESCRIPTION OF THE PREFERRED EMBODIMENTS

Figure 1:
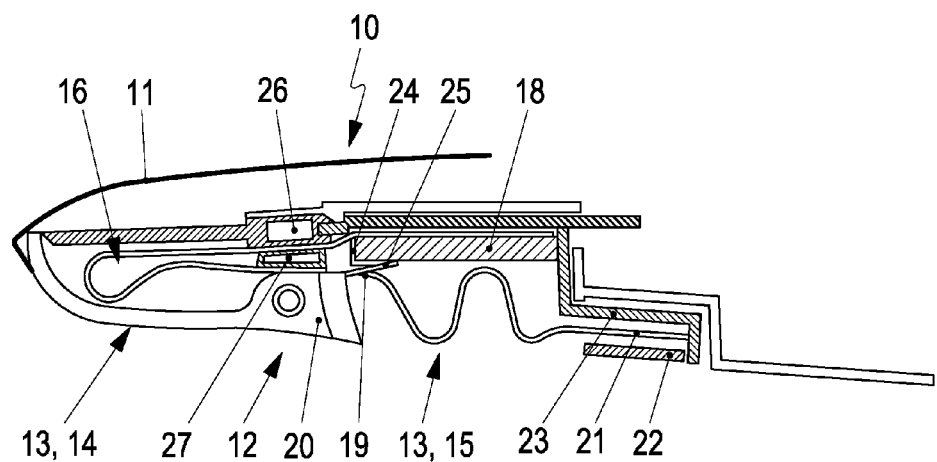
FIG. 1 shows a first embodiment of an air guiding device of the invention in a retracted inoperative position.
Figure 2:
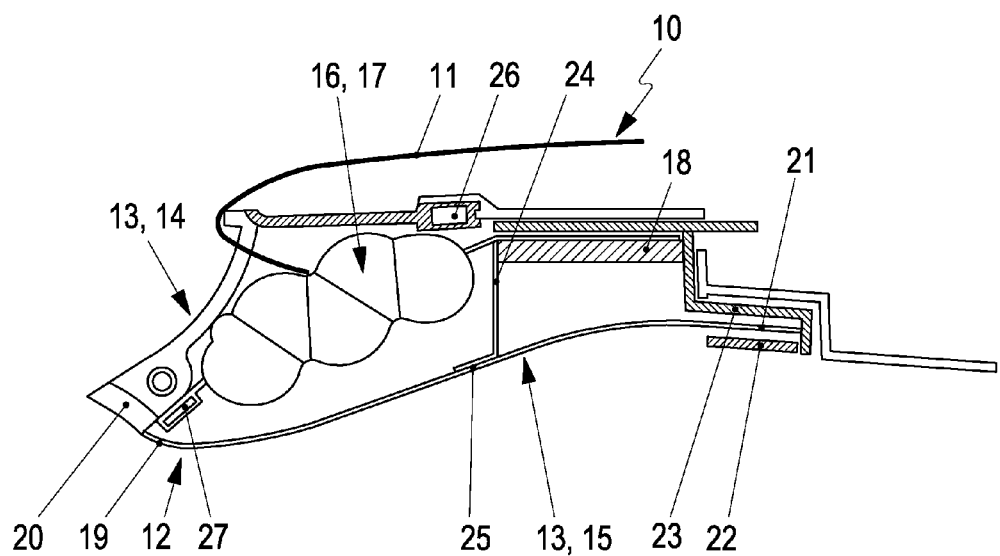
FIG. 2 shows the air guiding device of FIG. 1 in an extended operating position.

FIGS. 1 and 2 show a detail of a front portion 10 of a motor vehicle in the region of a forward structure part 11 that forms a front end of the front portion 10 of the motor vehicle.

An air guiding device 12 is positioned in the region of the forward structure part 11 and extends completely or partially over the width of the forward structure part 11. The air guiding device 12 comprises an air guiding element 13, which, in the embodiment of FIGS. 1 and 2, is formed by a spoiler lip 14 and an elastically deformable sheet-like element 15.

The air guiding element 13 can be displaced with the aid of an actuating element 16 between an extended operating position (see FIG. 2) and a retracted inoperative position (see FIG. 1). The air guiding element 13 has an aerodynamic air guiding effect in the extended operating position, but has substantially no aerodynamic air guiding effect in the retracted inoperative position.

The actuating element 16 of FIGS. 1 and 2 is a pneumatic actuating element with a plurality of air chambers 17. More particularly, the pneumatic actuating element 16 of FIGS. 1 and 2 has five air chambers 17 arranged next to one another in a row. However, more or fewer air chambers 17 may be provided. The air chambers 17 of the actuating element 16 can be filled with air to transfer the air guiding device into the operating position shown in FIG. 2, while air can be let out of the air chambers 17 to transfer the air guiding device into the inoperative position shown in FIG. 1. The air chambers form a pneumatic actuator for displacing the air guiding element 13, and the actuating element 16 is mounted by a fastening strip 18 on the forward structure part 11.

In the operating position (see FIG. 2), the spoiler lip 14 forms a downwardly directed extension of the forward structure part 11 and is directed substantially rearwardly in the inoperative position (see FIG. 1).

The elastically deformable sheet-like element 15 of the air guiding element 13 adjoins below the forward structure part 11 behind the spoiler lip 14.

A front portion 19 of the elastically deformable sheet-like element 15 acts on a portion 20 of the spoiler lip 14 that is in a lower position when the spoiler lip 14 is in the operating position and that is in a rear position when the spoiler lip 14 is in the inoperative position. A rear portion 21 of the elastically deformable sheet-like element 15 of the air guiding element 13 is secured via a fastening strip 22 on a rear portion 23 of the forward structure part 11.

The elastically deformable sheet-like element 15 has an outer contour that provides laminar flow guidance in the extended operating position of the air guiding element 13 shown in FIG. 2. At least one elastic tension band 24 acts on the sheet-like element 15 to bring and hold the elastic sheet-like element 15 into the shape of the extended operating position shown in FIG. 2 for achieving laminar flow guidance.

The tension band 24 has a first end that acts on a central portion 25 of the sheet-like element 15 of the air guiding element 13 and a second end on the fastening strip 18 for the actuating elements 16. Provision is made for the negative pressure to draw the sheet-like element 15 down, and, if appropriate, the actuator 16 also can press down. The tension band or bands 24 locally limit the downward deflection to ensure the ideal contour even at high speeds (high negative pressure).

Accordingly, in the embodiment of FIGS. 1 and 2, the air guiding element 13 of the air guiding device 12 comprises the spoiler lip 14 and the elastically deformable sheet-like element 15. The spoiler lip 14 extends the forward structure part 11 down in the extended operating position.

The pneumatic actuating element 16 with the multiple air chambers 17 is used to displace the spoiler lip 14 between the retracted inoperative position of FIG. 1 and the extended operating position of FIG. 2. The actuating element 16 is secured on the fastening strip 18 acts on the lower portion 20 of the spoiler lip 14 in the operating position, and on the rear portion 20 of the spoiler lip 14 in the inoperative position.

The front end 19 of the elastic sheet-like element 15 of the air guiding element 13 also acts on the portion 20 of the spoiler lip 14 that is at a lower position in the extended operating position of the spoiler lip 14 and that is at a rear position in the inoperative position of the spoiler lip 14. As a result, when extending the spoiler lip 14 into the operating position of FIG. 2, the elastic sheet-like element 15 is stretched. The elastic tension band 24 acts on a central portion 25 of the sheet-like element 15 and cooperates with the actuating element 16 on the same portion of the fastening strip 18 to bring the sheet-like element 15 into a shape of defined curvature and to hold this shape so that the outer contour of the sheet-like element 15 functions for laminar flow guidance.

As shown in FIGS. 1 and 2, the forward structure panel 11 and the portion 20 of the spoiler lip 14 each are assigned a magnetic element 26 or 27 to hold the spoiler lip 14 in a defined position on the forward structure part 11 in the retracted inoperative position shown in FIG. 1.

Figure 3:
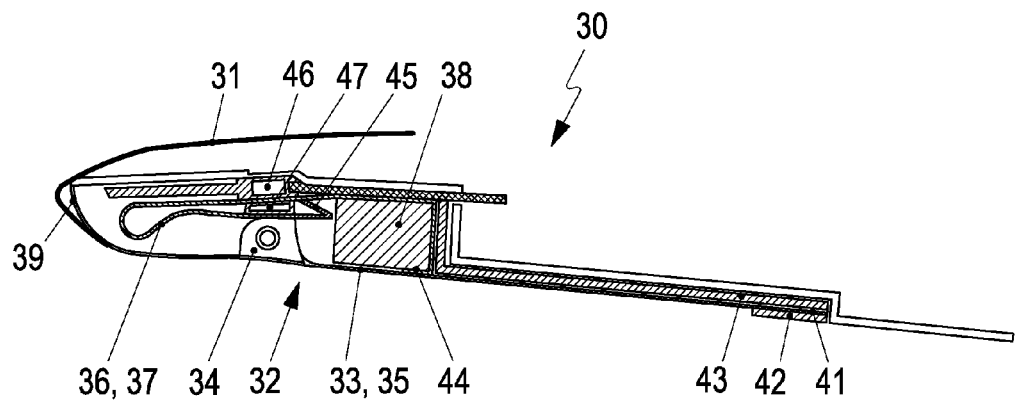
FIG. 3 shows a second exemplary embodiment of an air guiding device of the invention in a retracted inoperative position.
Figure 4:
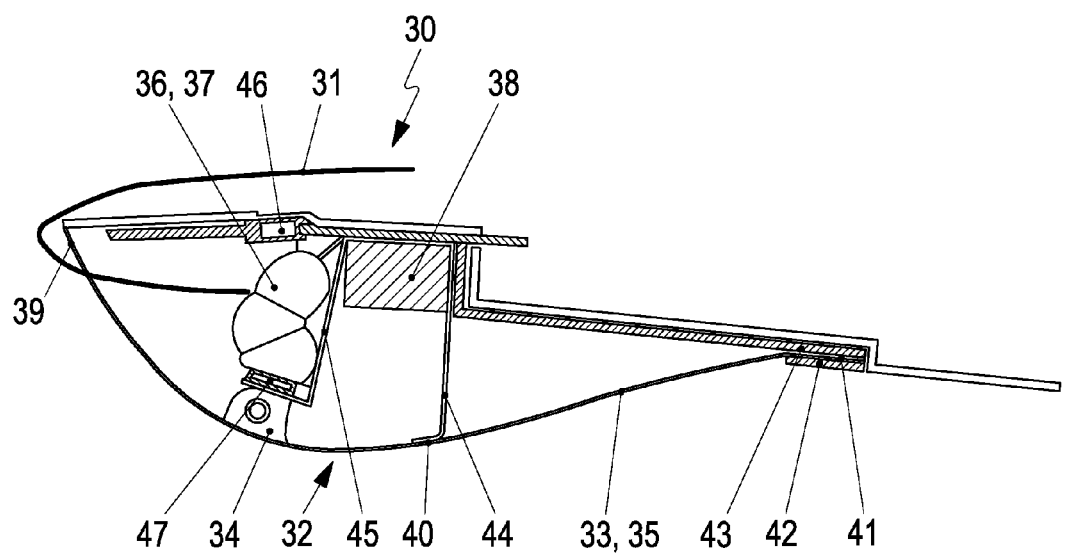
FIG. 4 shows the air guiding device of FIG. 3 in an extended operating position.

FIGS. 3 and 4 show a detail of an alternative front portion 30 of a motor vehicle in the region of a forward structure part 31. The region of the forward structure part 31 of the motor vehicle again has an air guiding element 33 of an air guiding device 32 that extends completely or partially over the width of the forward structure part 31. However, the air guiding element 33 of FIGS. 3 and 4 does not comprise a spoiler lip. Rather, the air guiding element 33 of FIGS. 3 and 4 is formed completely by an elastically deformable sheet-element 35. The elastically deformable sheet-like element 35 is below the forward structure part 31 and acts with a front portion 39 on a front portion of the forward structure part 31 and with a rear portion 41, via a fastening strip 42, on a rear portion 43 of the forward structure part 31.

The air guiding element 33 of the air guiding device 32 of FIGS. 3 and 4 is formed completely by the elastically deformable sheet-like element 35, and can be displaced with the aid of an actuating element 36 between the retracted inoperative position of FIG. 3 and the extended operating position of FIG. 4. The actuating element 36 once again is configured as a pneumatic actuating element with air cushions 37 that can be filled with air or emptied dependent on the desired displacement direction. A fastening strip 38 fastens the actuating element 36 to the forward structure part 31.

In FIGS. 3 and 4, the actuating element 36 has three air cushions 37 that are positioned next to one another in a row. The actuating element 36 acts on a portion 34 of the elastically deformable sheet-like element 35 and on the fastening strip 38. The portion 34 of the sheet-like element 35 on which the actuating element 36 acts is positioned between the portions 39, 42 of the sheet-like element 35.

At least one elastic tension band 44 acts on a portion 40 of the elastic sheet-like element 35, as shown in FIG. 4. The tension band 44 brings the elastically deformable sheet-like element 35 into the shape shown in FIG. 4 when in the extended operating position and holds that shape so that an outer contour achieves laminar flow guidance. The portion 40 of the elastic sheet-like element 35 on which the tension band 44 acts is between the portion 34 on which the actuating element 36 acts and the rear portion 42 of the sheet-like element 35.

The tension band 44 acts with a first end on the portion 40 of the elastic sheet-like element 35 and with an opposite second end on the fastening strip 38 of the actuating element 36. Thus, tension band 44 and actuating element 36 act on opposite portions of the fastening strip 38.

The elastic sheet-like element 35 of FIG. 4 is held in the extended operating position via a further elastic tension band 45 to achieve the defined shape for laminar flow guidance. The further elastic tension band 45 acts with a first end together with the actuating element 36 on the portion 34 of the sheet-like element 35. The further tension band 45 acts with an opposite second end on the fastening strip 38 of the actuating element 36, namely together with the actuating element 36 on the same portion of the fastening strip 38.

In the extended operating position of FIG. 4, the elastic sheet-like element 35 is contoured or curved convexly out or down at a front portion and concavely in or up in the rear portion. In the extended operating position, the air guiding element 33 also provides a protection from damage in the event of a bottoming-out of the motor vehicle.

Magnetic elements 46, 47 are provided to hold the air guiding element 33 in a defined position on the forward structure part 31 in the retracted inoperative position of FIG. 3.

Common to both exemplary embodiments is that the air guiding element 13 or 33 has an elastically deformable sheet-like element 15 or 35 that is brought into a defined shape by at least one elastic tension band 24 or 44, 45 in the extended operating position of the air guiding element 13 or 33 so that the outer contour of the elastic sheet-like element 15 or 35 serves for laminar flow guidance. An aerodynamically active component, such as a diffusor, positioned downstream of the air guiding device 12 or 32 thus can be subjected to improved flow.

What is claimed is:

1. An air guiding device of a motor vehicle, comprising: an air guiding element in a region of a forward structure of the motor vehicle and extending completely or partially over a width of the motor vehicle, and an actuating element for displacing the air guiding element between an extended operating position in which an outer contour of the air guiding element has an aerodynamic air guiding effect, and a retracted inoperative position, in which the air guiding element has substantially no aerodynamic air guiding effect, the air guiding element being formed at least in certain portions from an elastically deformable sheet-like element with an outer contour that can be brought into a shape that ensures laminar flow guidance.

2. The air guiding device of claim 1, further comprising at least one elastic tension band having a first end acting on the sheet-like element and bringing the air guiding element into the operating position.

3. The air guiding device of claim 2, further comprising a spoiler lip that forms a downwardly directed extension of the forward structure in the operating position and is directed rearwardly in the inoperative position, the elastically deformable sheet-like element being adjoined behind the spoiler lip so that a front portion of the elastically deformable sheet-like element is at a lower portion of the spoiler lip when the air guiding element is in the operating position, and is at a rear portion of the spoiler lip when the air guiding element is in the inoperative position portion, the elastically deformable sheet-like element having a rear portion secured on the forward structure part.

4. The air guiding device of claim 2, wherein the elastic tension band acting on the sheet-like element brings the sheet-like element into a shape in the operating position so that the sheet-like element is shaped at the front convexly down and out.

5. The air guiding device of claim 2, wherein an elastic tension band acts on a central portion of the sheet-like element to obtain a flow-optimized outer contour.

6. The air guiding device of claim 5, wherein the elastic tension band has a second end secured on a fastening strip for the actuating element.

7. The air guiding device of claim 6, wherein the actuating element has air chambers and has a first end that acts on a lower portion of the spoiler lip in the operating position and that acts on a rear portion of the spoiler lip in the inoperative position, the actuating element further having a second end on a fastening strip for the actuating element.

8. The air guiding device of claim 1, wherein the air guiding element is formed completely by the elastically deformable sheet-like element, the elastically deformable sheet-like element acts with a front portion on a front portion of the forward structure part and with a rear portion on a rear portion of the forward structure part.

9. The air guiding device of claim 8, wherein the actuating element has air chambers, a first end that acts on a portion of the elastically deformable sheet-like element and a second end that acts on a fastening strip for the actuating element.

10. The air guiding device of claim 9, further comprising an elastic tension band that acts on a portion of the sheet-like element that is situated behind the portion (34) on which the actuating element acts.

11. The air guiding device of claim 10, wherein the elastic tension band further acts with an opposite end on a fastening strip for the actuating element.

12. The air guiding device of claim 11, wherein the elastic tension band acting on the sheet-like element and the actuating element bring the sheet-like element into shape in the operating position so that the sheet-like element is shaped convexly down and out at the front and at the rear to achieve laminar flow.

13. The air guiding device of claim 12, wherein an elastic tension band acts on a portion of the sheet-like element to obtain a flow-promoting outer contour, and in that the elastic tension band further acts with an opposite end on the fastening strip for the actuating element.

* * * * *